Figure 1:
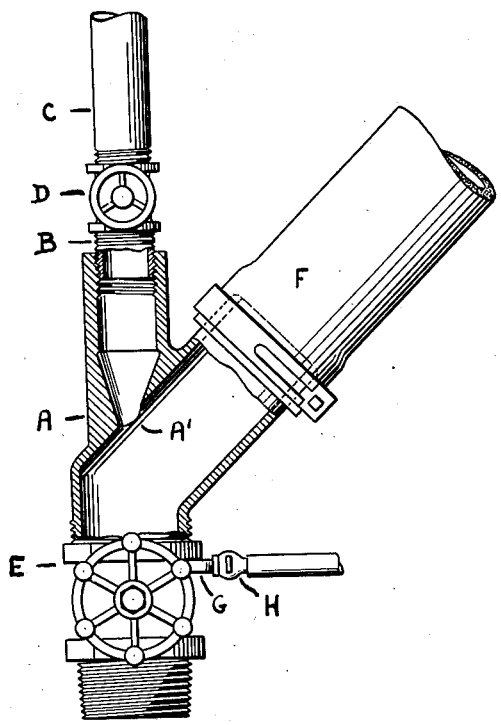

April 27, 1926.

D. A. LEGG ET AL 1,582,409

INOCULATING DEVICE

Filed July 6, 1925

Inventors
DAVID. A. LEGG.
CLARENCE. W. HANCOCK.
By Bruce. K. Brown.
Atty

Patented Apr. 27, 1926.

1,582,409

UNITED STATES PATENT OFFICE.

DAVID A. LEGG, OF TERRE HAUTE, INDIANA, AND CLARENCE W. HANCOCK, OF PEORIA, ILLINOIS, ASSIGNORS TO COMMERCIAL SOLVENTS CORPORATION, OF TERRE HAUTE, INDIANA, A CORPORATION OF MARYLAND.

INOCULATING DEVICE.

Application filed July 6, 1925. Serial No. 41,672.

*To all whom it may concern:*

Be it known that we, DAVID A. LEGG and CLARENCE W. HANCOCK, both subjects of the King of Great Britain and Ireland, the said LEGG residing at Terre Haute, county of Vigo, and State of Indiana, and the said HANCOCK at Peoria, in the county of Peoria and State of Illinois, have invented certain new and useful Improvements in an Inoculating Device, of which the following is a specification.

Our invention pertains to the industrial operation of fermentation processes and relates specifically to a new type of apparatus whereby it is possible to conveniently and safely inoculate a sterile mash of carbohydrates contained in a closed vessel or "fermenter" with a culture of bacteria contained in a suitable growth media, without subjecting the sterile mash to exposure to and contamination by bacteria or organisms not desired in the process.

The production of butyl alcohol and acetone by the fermentation of carbohydrates with suitable bacteria is a process in which our apparatus is extremely useful. In this process corn mash is prepared, sterilized, and then transported to large previously-sterilized tanks known as fermenters. To prevent contamination by foreign bacteria or other organisms, these fermenters are sealed off from the outside air, the only access thereto being by certain pipe lines necessary in the operation.

When the sterilized mash has been placed in the previously-sterilized fermenter, it is necessary to inoculate the mash with a culture of the butyl-acetonic bacillus and it is very important that during this operation no contaminating organisms be introduced with the inoculant.

In the past it has been customary to perform the inoculation operation by opening a gate valve in the top of the fermenter, inserting a suitable funnel in the top of the valve, and pouring the inoculant (culture of bacteria in a suitable media) into the fermenter through the funnel and gate valve. This method of inoculation has been the cause of much trouble in the past.

Foreign bacteria and moulds in the air are readily entrained by the inoculant as it is poured into the fermenter and these organisms set up counter-fermentation which result in great expense owing to the diminution of the yield of the desired products. Furthermore, the inoculating media containing the bacteria is ordinarily a viscous carbohydrate mash and particles of the mash are deposited in the fittings and crevices of the inoculating valve. This residual mash is quickly inoculated with various foreign bacteria present in the air and a contaminating fermentation is set up in the mash residue left in the valve. When the valve is next used for inoculating a fresh batch of mash, the inoculant washes some of the residual mash containing foreign bacteria into the fermenter and the mash therein is thus contaminated with foreign organisms.

It is the purpose of our invention to provide a suitable inoculating device of such construction and operation that a mash may be inoculated with a culture of bacteria without introducing foreign organisms.

This inoculating device is represented in cross section in Figure 1 of the accompanying drawing. In Figure 1, A is a metallic device similar to an ordinary pipe Y, and in fact may be so constructed. B is a reducing nipple which serves to join A to C which is a pipe adapted to carry live steam under pressure. This steam may be controlled by valve D. The lower end of A is threaded to fit into an ordinary gate valve E which may be attached to the vessel containing the mash to be inoculated.

F is a flexible extension of A and is in this case represented as a piece of rubber hose clamped theron. G is a pipe tapped into the compartment A and positioned immediately above gate valve E. It is used to drain off condensed steam in a manner later to be described. H is a stop cock in pipe G, by means of which the flow of liquid through the pipe may be regulated.

In using this inoculating device it is threaded in an orifice in the top of the fermenting vessel. The pipe C is connected to a live steam line and at all times except those later to be mentioned, the valve D is opened. This causes the passage of live steam through valve D into A. The steam passes through the constriction A' and impinges with some force on the top of the gate valve E which is closed at the time. After impingement, the steam is reflected upward and passes out through pipe F which is open to the air. The slight amount of water condensed is drained off through pipe G. Valve H is adjusted so that the water may pass out.

The advantages of this inoculating device are obvious to those skilled in the art. The gate valve E is normally closed and thus protects the mash in the fermenter from contamination. The constant impingement of live steam on the top of the gate valve E produces a constant sterilization. The passage of live steam upward through A into pipe F and out into the atmosphere constantly sterilizes the inoculating device itself. The water of condensation is continuously removed through pipe G so that hot water does not collect in the device.

When it is desired to inoculate the fermenter with a culture of bacteria, the mouth of the flask containing the inoculant is brought up to the opening at the end of pipe F. The live steam is allowed to play on the stopper of the inoculating flask. The valve H is then closed and gate valve E is opened. As the inoculant is poured down pipe F the steam jet is diminished or entirely cut off by manipulating valve D.

When all of the inoculant has been poured through F, A, and E into the fermenter, and before the mouth of the flask has been removed from F, valve E is shut, valve H is opened, and valve D, controlling the steam is opened or opened wider, as the case may be. The inoculation is then complete and, by the use of our new device, it is completed antiseptically without any possible chance of contaminating the mash in the fermenter.

While we have described our preferred method of using this device it is obvious that if desired, the steam passing through valve D into the device may alternatively be cut off except just prior to inoculation. However, for thorough sterilization we prefer to pass steam through the device at all times.

While we have mentioned the use of this device in the operation of the butyl-acetonic fermentation process it is obvious that it may be employed generally for inoculating purposes.

Now, having fully described our invention, we claim the following as new and novel:

1. An inoculating device comprising a main inoculating valve subjacent to an inoculating chamber, an orifice in said chamber positioned to impinge a jet of live steam on the upper internal surface of the inoculating valve, a side neck through which the steam escapes and into which the inoculant fluid is poured, and a drain to remove condensed steam from the device.

2. An inoculating device comprising a main inoculating valve subjacent to an inoculating chamber, a constricted orifice in said chamber positioned to impinge a jet of live steam, valve controlled, on the upper internal surface of the inoculating valve, a side neck through which the steam escapes and into which the inoculant fluid is poured, and a drain, valve controlled, to remove condensed steam from the device.

In testimony whereof we affix our signatures.

DAVID A. LEGG.
CLARENCE W. HANCOCK.